US012584424B2

(12) United States Patent
Conlon

(10) Patent No.: US 12,584,424 B2
(45) Date of Patent: *Mar. 24, 2026

(54) START-UP AND CONTROL OF LIQUID SALT ENERGY STORAGE COMBINED CYCLE SYSTEMS

(71) Applicant: PINTAIL POWER LLC, Palo Alto, CA (US)

(72) Inventor: William M. Conlon, Palo Alto, CA (US)

(73) Assignee: PINTAIL POWER LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/924,460

(22) Filed: Oct. 23, 2024

(65) Prior Publication Data

US 2025/0043701 A1 Feb. 6, 2025

Related U.S. Application Data

(60) Division of application No. 18/198,586, filed on May 17, 2023, now Pat. No. 12,129,773, which is a (Continued)

(51) Int. Cl.
F01K 13/02 (2006.01)
F01K 3/18 (2006.01)

(Continued)

(52) U.S. Cl.
CPC .............. F01K 13/02 (2013.01); F01K 3/186 (2013.01); F01K 3/22 (2013.01); F01K 23/10 (2013.01);

(Continued)

(58) Field of Classification Search
CPC . F01K 13/02; F01K 3/186; F01K 3/22; F01K 23/10; F01K 23/101; F01K 3/12;

(Continued)

(56) References Cited

U.S. PATENT DOCUMENTS 2,910,244 A * 10/1959 Payne ........................ F22B 1/04
165/104.31
3,562,367 A * 2/1971 Shinohara et al. ........ C08J 9/06
521/88

(Continued)

FOREIGN PATENT DOCUMENTS

EP 1701006 B1 10/2016
WO 2017/079617 A1 5/2017

OTHER PUBLICATIONS

From the USPTO as the ISA, Notification of Transmittal of the International Search Report and the Written Opinion of the International Searching Authority, or the Declaration, PCT/US2021/060132, Feb. 8, 2022, 8 pages.

(Continued)

*Primary Examiner* — Gerald L Sung
*Assistant Examiner* — Rene D Ford
(74) *Attorney, Agent, or Firm* — Schmidt Patent Law, Inc.

(57) ABSTRACT

The invention relates generally to methods and apparatus for start-up and control of liquid salt energy storage combined cycle systems.

20 Claims, 4 Drawing Sheets

Related U.S. Application Data continuation of application No. PCT/US2021/060132, filed on Nov. 19, 2021.

(60) Provisional application No. 63/147,021, filed on Feb. 8, 2021, provisional application No. 63/117,248, filed on Nov. 23, 2020.

(51) Int. Cl.

| | |
|---|---|
| *F01K 3/22* | (2006.01) |
| *F01K 23/10* | (2006.01) |
| *F02C 6/18* | (2006.01) |
| *F22B 1/06* | (2006.01) |
| *F22D 1/32* | (2006.01) |

(52) U.S. Cl.
CPC .............. *F01K 23/101* (2013.01); *F02C 6/18* (2013.01); *F22B 1/06* (2013.01); *F22D 1/325* (2013.01)

(58) Field of Classification Search
CPC . F22B 1/06; F22D 1/325; F22D 1/003; Y02E 20/16
See application file for complete search history.

(56) References Cited

U.S. PATENT DOCUMENTS

| | | | | |
|---|---|---|---|---|
| 9,322,295 | B2 | 4/2016 | Pang et al. | |
| 12,129,773 | B2 | 10/2024 | Conlon | |
| 2006/0174622 | A1 | 8/2006 | Skowronski | |
| 2010/0058764 | A1* | 3/2010 | Conchieri | F01K 23/106 |
| | | | | 60/739 |
| 2011/0083443 | A1 | 4/2011 | Jockenhoevel et al. | |
| 2011/0127773 | A1 | 6/2011 | Freund et al. | |
| 2013/0147197 | A1 | 6/2013 | Goebel et al. | |
| 2013/0152586 | A1 | 6/2013 | Mishima et al. | |
| 2014/0223906 | A1* | 8/2014 | Gee | F03G 6/071 |
| | | | | 60/641.15 |
| 2017/0010024 | A1 | 1/2017 | Wortmann et al. | |
| 2018/0245485 | A1 | 8/2018 | Conlon | |
| 2019/0226462 | A1 | 7/2019 | Conlon | |

OTHER PUBLICATIONS

The extended European Search Report, EP21895686.0 / 4248068, Oct. 29, 2024, 7 pages.

* cited by examiner

| Combustion Turbine | Simple Cycle | | Liquid Salt Combined Cycle | | | | | |
| | Power (kW) | Heat Rate (Btu/kWh) | Exh. Temp (°C) | Steam (bar/°C) | Net Power (kW) | Fuel Heat Rate (Btu/kWh) | Primary Energy Rate (kWh/kWh) | Steam Flow (kg/s-MW) | Salt Flow (kg/kWh) |
| GE 7FA.04 | 195,237 | 8827 | 607 | 80/550 | 383,890 | 4489 | 0.61 | 0.87 | 12.8 |
| Siemens SGT-800 | 56,523 | 8568 | 566 | 70/525 | 105,859 | 4575 | .70 | .874 | 11.9 |
| GE LM6000 | 49,955 | 8513 | 450 | 40/425 | 91,949 | 4625 | 0.92 | 1.05 | 12.5 |

Figure 3

START-UP AND CONTROL OF LIQUID SALT ENERGY STORAGE COMBINED CYCLE SYSTEMS

CROSS REFERENCE TO RELATED APPLICATIONS

This application is a divisional of U.S. patent application Ser. No. 18/198,586 filed May 17, 2023, which is a continuation of International Patent Application PCT/US2021/060132 filed Nov. 19, 2021. PCT/US2021/060132 claims benefit of priority to U.S. Provisional Patent Application No. 63/147,021 filed Feb. 8, 2021, and to U.S. Provisional Patent Application No. 63/117,248 filed Nov. 23, 2020. Each of the priority patent applications identified in this paragraph is incorporated herein by reference in its entirety.

FIELD OF THE INVENTION

The invention relates generally to methods and apparatus for start-up and control of liquid salt energy storage combined cycle systems.

BACKGROUND

Renewable resources are so abundant in some places that after displacing fossil generation, the renewables must also be curtailed. For example, on Apr. 21, 2019, before COVID related load reductions, the California Independent System Operator (CAISO) curtailed almost 32 GWh of solar energy because generation exceeded demand. For both economic and environmental reasons, it is essential to store this otherwise curtailed energy for use when the natural variability of renewable resources demands backup from dispatchable generation. Each day, as solar production begins, the CAISO grid experiences a large and rapid drop in net load that forces combined cycle plants off-line. And as solar production wanes in the late afternoon, these plants must rapidly come back on-line. These two related grid operational issues-over-generation and renewable curtailment, and steep ramps in the load served by CAISO are phenomena that create the now famous "Duck Curve" shown in FIG. 1.

SUMMARY

In a first aspect of the invention, a combined cycle electric power plant comprises a combustion turbine generator that combusts fuel to generate electricity and produce hot exhaust gases, a second heat source different from the combustion turbine, a thermal energy storage system that stores heat from the second heat source, a steam turbine generator that expands superheated steam across a steam turbine to generate electricity, a feedwater reservoir that stores feedwater condensed from steam exhausted from the steam turbine, a feedwater preheater configured to heat feedwater from the feedwater reservoir with heat exclusively from the combustion turbine exhaust gases, a boiler configured to boil feedwater from the feedwater preheater with heat exclusively from the thermal energy storage system to generate steam, a superheater configured to heat steam from the boiler exclusively with heat from the combustion turbine exhaust gases to generate the superheated steam, a third heat source different from the combustion turbine, and a startup feedwater heater. The startup feedwater heater is configured to use heat from the third heat source to heat feedwater from the feedwater reservoir to a temperature greater than a freezing point of a heat transfer fluid used to transfer the heat from the thermal energy storage system to the boiler.

The startup feedwater heater may be arranged in parallel with the feedwater preheater between the feedwater reservoir and the boiler.

The combined cycle electric power plant may comprise a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

The combined cycle electric power plant may also comprise a startup superheater connected in parallel with the superheater between the boiler and the steam turbine and configured to heat steam from the boiler using heat exclusively from the thermal energy storage system.

In a second aspect of the invention, a method of operating the combined cycle power plant of the first aspect of the invention comprises heating feedwater from the feedwater reservoir to a temperature greater than the freezing point of the heat transfer fluid using the startup feedwater heater. The method may also comprise recirculating the feedwater heated by the startup feedwater heater to the feedwater reservoir to heat feedwater in the feedwater reservoir to a temperature greater than the freezing point of the heat transfer fluid.

The method may comprise heating the boiler to a temperature greater than the freezing point of the heat transfer fluid using feedwater heated by the startup feedwater heater. After so heating the boiler, the method may comprise circulating heat transfer fluid from the thermal energy storage system through the boiler to generate steam from feedwater using heat transferred by the heat transfer fluid from the thermal energy storage system. The method may further comprise directing some or all of the steam to the feedwater reservoir to heat feedwater in the feedwater reservoir. The method may comprise bypassing the superheater to provide steam from the boiler to the startup superheater, superheating the steam in the startup superheater; and expanding the superheated steam across the steam turbine.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 3 tabulates operating parameters for several example power generation systems comprising commercially available combustion turbines operated in a simple cycle or in a LSCC system as described herein.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. As used in this specification and the appended claims, the singular forms "a," "an," and "the" include plural referents unless the context clearly indicates otherwise.

This specification discloses apparatus, systems, and methods for start-up and control of liquid salt energy storage combined cycle systems.

Figure 2:
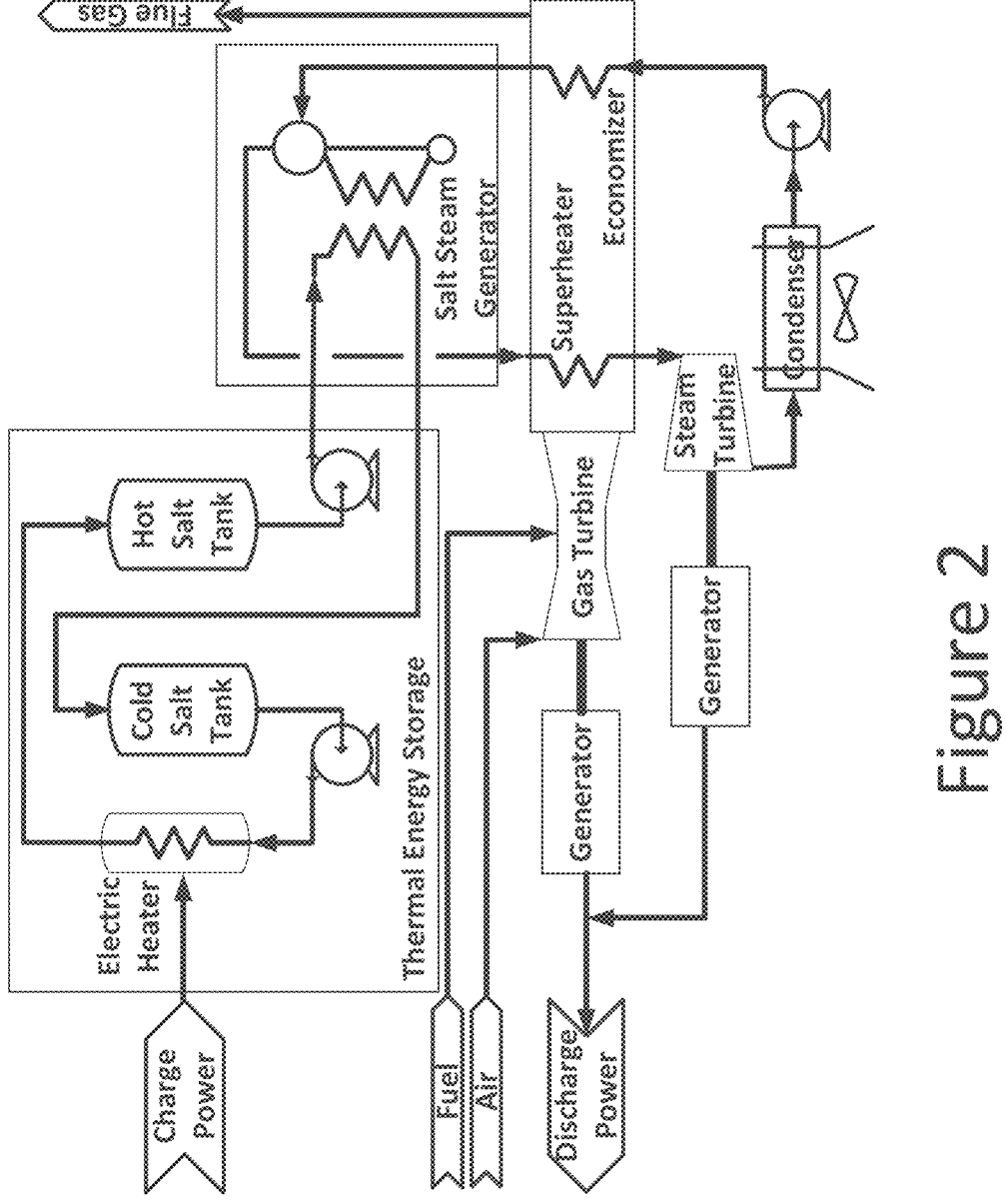
FIG. 2 schematically shows an example liquid salt energy storage combined cycle (LSCC) system.

The example liquid salt combined cycle (LSCC) system shown in FIG. 2 integrates thermal energy storage with gas and steam turbines in a novel system that enables faster start-up and improved plant fuel efficiency. By moving evaporative heating duty outside the exhaust heat recovery steam generator, this arrangement removes heat transfer constraints to increase steam turbine flow and power output without increasing combustion turbine fuel flow, resulting in exceptionally low fuel Heat Rate.

Steam is evaporated using energy stored in molten salt, while the gas turbine exhaust is used to economize and then superheat the steam in a non-reheat steam cycle. A single-pressure non-reheat LSCC allows much higher steam flow and steam turbine power than in a triple-pressure reheat combined cycle. Removing the high-pressure drum, and using stored energy for pre-heat, also facilitates fast start-up which is needed in markets with large penetration of variable renewable energy.

LSCC can be used with any gas turbine, including industrial, frame, and acro-derivatives, to boost output. The system improves the efficiency metrics for a hybrid energy storage plant: the Fuel Heat Rate and Primary Energy Rate, which are the ratios of fuel and stored energy input per unit of electricity output from the overall system. As tabulated in FIG. 3, hybrid integration results in low fuel heat rate and a fractional primary energy rate, meaning more electricity is delivered than stored. The combustion turbine exhaust increases the efficiency of converting stored thermal energy to electricity, and the stored energy displaces fuel. This is an effective greenhouse gas (GHG) reduction strategy, reduces the cost of storing and time-shifting renewable power, and by reducing the fuel heat rate, makes it more economical to use expensive fuels, such as those produced with renewable energy.

Compared to parabolic trough or tower Concentrating Solar Power (CSP) plants, there is about an 80% reduction in the mass and volume of salt needed per MWh of electric energy delivered. About 12.5 kg of salt are used per kWh of electricity, as tabulated in FIG. 3. At a cost of $2000 per metric ton of salt ($2/kg), the cost of storage is about $25/kWh of electricity, or about 25% of the anticipated future cost for Lithium-ion battery packs. By using high temperature exhaust for superheating steam, molten salt can be stored at temperatures compatible with carbon steel tanks and piping, to reduce cost compared to storage systems that use high temperature thermal storage without exhaust gas augmentation.

LSCC uses electric heaters to store low-cost or otherwise curtailed renewable energy with high electric to thermal efficiency. As heat loss rates from storage are typically <1% per day, this energy can remain stored in the LSCC tank(s) for many days until needed. The salt is also non-toxic, non-flammable, and does not degrade with use, no matter how often the system is cycled, or how fast it is charged or discharged.

Electric heating provides charging flexibility that can rapidly add or drop load to compensate for variability of wind and solar generation, and even provide frequency regulation using solid-state controls with sub-cycle response. Likewise, the LSCC generator could provide voltage regulation as a synchronous condenser by inserting a clutch on the shaft between the steam turbine generator.

The LSCC system has three primary operating modes: charging, standby, and discharging.

The charging operating mode occurs when demand for electric power and its cost is low, using electricity as the primary energy source to heat the storage system. Molten salt is pumped from a cold salt storage tank through an (e.g., electric) heater and then into the Hot Tank. Other forms of heating could be used, including heat pumps, heating by solar thermal energy, indirect heating using a heat transfer medium or heat from another process, such as exhaust from a powerplant, steel or glass mill, etc. Typically, charging would occur during periods of abundant or excess renewable energy production, so the combustion turbine would not need to operate. However, during unusual events such as grid outages, or when renewable power is unavailable due to weather, fires, sabotage, etc., the combustion turbine could be a charging source, using both electricity and exhaust heat.

The standby operating mode occurs when primary energy is neither stored nor discharged by the system. During standby, heat losses to the environment will reduce the temperature of molten salt in the storage tanks and piping, and the temperature of the working fluid and piping in the bottoming power cycle. During standby, the heat losses from insulated molten salt storage tanks are typically less than 1% per day, which might correspond to about 1° C. per day.

The discharge operating mode occurs when primary energy (electricity) is produced by the system using a combination of fuel and stored energy. The combustion turbine produces power from fuel and the steam turbine produces power using heat from the molten salt tank and from the combustion turbine exhaust gas.

The present invention provides methods and apparatus for starting the LSCC discharge mode after charging or standby periods. Before describing the start-up methods and apparatus, an example system will first be described in discharge operating mode at full power with representative temperatures and pressures.

Figure 4:
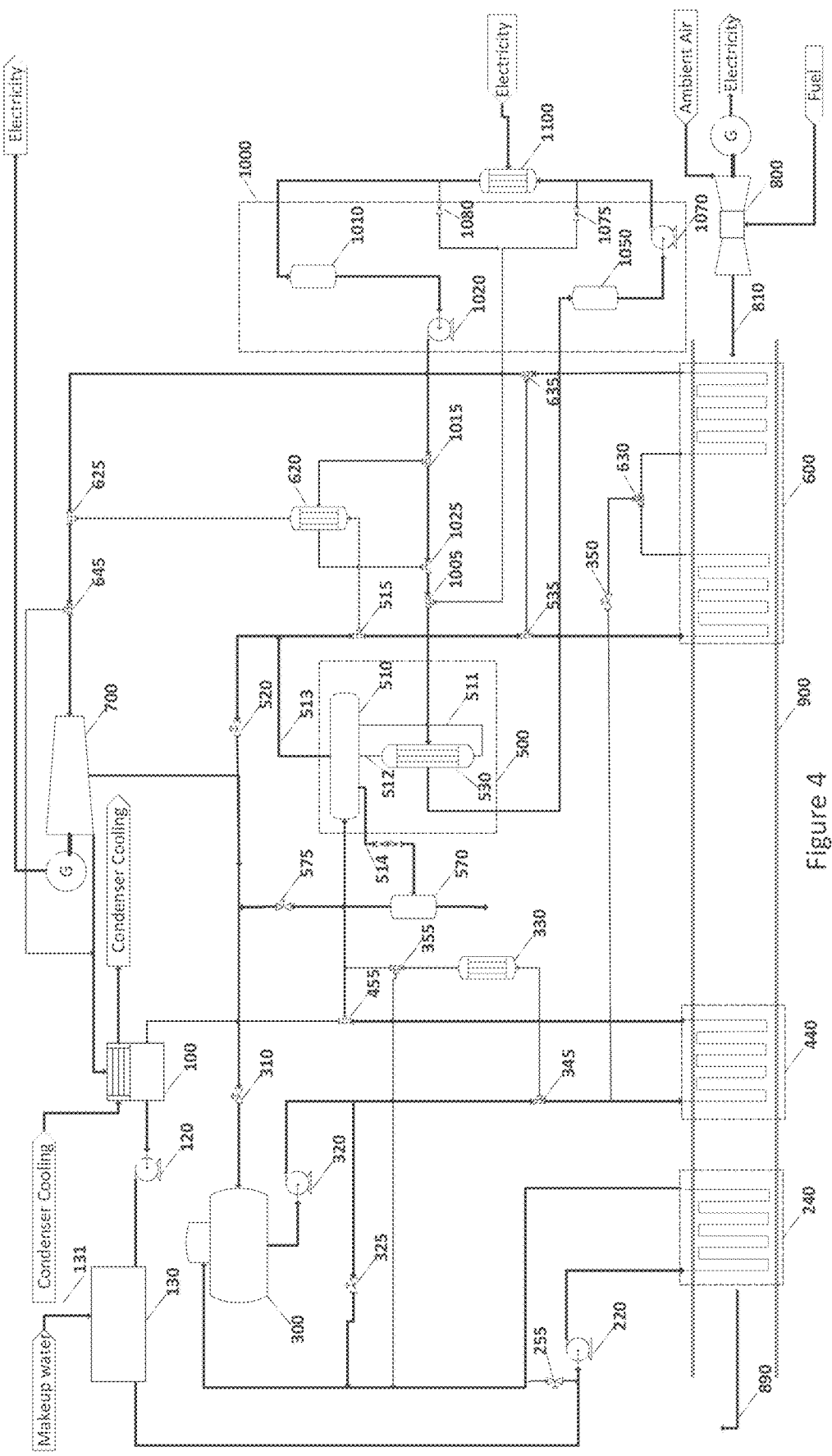
FIG. 4 shows another example LSCC system, like that of FIG. 3.

An example LSCC system is illustrated in FIG. 4, which shows a steam Rankine Bottoming Cycle receiving energy from combustion turbine exhaust and from hot molten salt, and rejecting energy to the environment by condenser cooling. The invention is described with reference to a particular combustion turbine, the General Electric LM6000PC SPRINT, with an air-cooled condenser for the steam cycle, instead of the water-cooled condenser shown in FIG. 4. Other combustion turbines could be readily substituted and alternate means of rejecting waste heat from the steam cycle could be provided, such as once-through water cooling or evaporative cooling towers. Likewise, the molten salt storage tanks, pumps, and heaters could be replaced with any suitable means of storing thermal energy. Different pressures and temperatures may be selected as design conditions or may result from operation at off-design conditions due to variation of ambient conditions or equipment degradation, or from the selection of a different combustion turbine or condenser cooling system.

During normal operation at full power, exhaust gas 810 from combustion turbine 800 is sent through a Heat Recovery System 900 comprising a superheater 600, economizer 440, and condensate heater 240 which cool the exhaust gas by heat transfer before the cooled exhaust gas 890 is discharged to the atmosphere. The exhaust gas path may also include a bypass damper, not shown in FIG. 4, to direct exhaust gas 810 directly to the atmosphere, without passing through the Heat Recovery System 900. There may also be emissions control equipment (not shown in FIG. 4) disposed at suitable locations within the exhaust gas Heat Recovery System. In an embodiment employing an LM6000 combustion turbine, exhaust gas 810 is delivered to the upstream side of superheater 600 at a temperature of approximately 450° C. and after passing through the Heat Recovery System 900 is discharged to the atmosphere as cooled exhaust gas 890 at about 70° C. Different combustion turbines would have different exhaust temperatures.

In addition to the exhaust heat provided by the combustion turbine 800, the steam Rankine Cycle is heated by molten salt heat transfer fluid from a Thermal Energy Storage System 1000 comprising one or more Hot Salt Storage Tanks 1010 and Cold Salt Storage Tanks 1050 each with an associated Hot Salt Pump 1020 and Cold Salt Pump 1070. In this embodiment, hot molten salt is stored in Hot Salt Storage Tank 1010 at a temperature of approximately 425° C., but higher or lower temperatures could also be used, as could alternative heat transfer fluids. The molten salt is transferred from Hot Salt Storage Tank 1010 by Hot Salt Pump 1020 through Molten Salt Steam Generator 500 to transfer heat and boil water at approximately 42 bar pressure. The salt is cooled by heat transfer and is returned to Cold Salt Storage Tank 1050 at a temperature of approximately 258° C. Molten Salt Steam Generator 500 may be a recirculating boiler with Steam Drum 510 and Salt Heat Exchanger 530 as shown in FIG. 4 or may be a once-through boiler without Steam Drum 510. For the recirculating boiler, water from Steam Drum 510 flows through line 511 to Salt Heat Exchanger 530 where heat transfer evaporates some of the water, with a two-phase (steam/water) mixture returns via line 512 to Steam Drum 510, which separates the liquid and vapor phases, with the vapor phase (steam) being discharged from Steam Drum 510 via line 513. Water may flow through line 511 via natural circulation or by means of a recirculation pump (not shown). The accumulation of dissolved solids in Steam Drum 510 may be reduced by liquid blow down through line 514 to Blowdown Tank 570.

In this embodiment, a three-component eutectic salt mixture is used (53% potassium nitrate, 7% sodium nitrate, and 40% sodium nitrite), commonly known the by tradename Hitec Heat Transfer Salt. This salt has a low freezing point (142° C.) and is compatible with plain carbon steel at temperatures up to 454° C. In contrast, the two-component eutectic salt mixture (60% Sodium Nitrate with 40% Potassium Nitrate) commonly known as solar salt as used in Concentrated Solar Power applications has a freezing point of 238° C. It is desirable to use the lower freezing point mixture to reduce or eliminate the risk of solidification of salt in Molten Salt Steam Generator 500.

The molten salt heat transfer fluid may also be used as the thermal energy storage medium in the two-tank system comprising a Hot Salt Storage Tank 1010 and Cold Salt Storage Tank 1050. Thermal energy could also be stored in a single tank with a thermocline layer between regions of hot and cold salt. A molten salt tank may also be partially filled with low-cost solid thermal storage media in order to displace the volume of molten salt and reduce the cost of storage. Molten salt could also be used as the heat transfer fluid to move heat into and out of solid media thermal storage.

At standard ambient conditions (15° C., sea level atmospheric pressure, 60% relative humidity) the LM6000 produces about 49,995 kW of electric power at full load while consuming 124,600 kW of fuel. In this embodiment at a steam condensing pressure of 0.076 bar, the Steam Turbine Generator 700 produces 43,921 kW of electric power, using a combination of exhaust heat from combustion turbine 800 and 83,120 kW of stored energy input via the molten salt. The Rankine Cycle operates in a circuit, which is now described starting at the Condenser 100, which condenses steam at a temperature of about 41° C. Condensate Pump 120 draws about 44.8 kg/s of condensate from the hot-well of Condenser 100 and pumps the water through an optional condensate polishing system. About 0.36 kg/s of Makeup Water 131 is added by Makeup Water System 130 to compensate for blowdown and other losses, so about 44.8 kg/s of water flows to the Low Pressure Circulating Pump 220. To avoid condensation of water of combustion on the exhaust gas side of the Condensate Heater 240, heated water is recirculated to the inlet of the Low Pressure Circulating Pump 220. About 9.3 kg/s of heated water at a temperature of about 124° C. is mixed with the condensate and makeup water to raise the temperature to about 55° C. This 55° C. water mixture is pumped through the condensate heater 240 to be heated to a temperature of about 124° C. by exhaust gas. Temperature Control Valve 255 adjusts the fraction of heated water that is recirculated to warm the mixture of condensate and makeup water.

About 44.8 kg/s of heated water flows to the deaerator 300, where it is further heated by 1.66 kg/s of steam at a pressure of 4.25 bar. This "pegging" steam is a combination of steam extracted from the steam turbine 700 and from the Blowdown Tank 570. The steam flowing to the deaerator is regulated by Pressure Control Valve 310 to maintain the deaerator pressure at 4 bar which corresponds to a saturation temperature of 143.6° C. Gases are largely insoluble at this temperature and are vented from the deaerator along with a small amount of steam. Customary chemicals may be injected into the deaerator 300 to scavenge oxygen, and to reduce corrosion throughout the Rankine Cycle.

About 46.5 kg/s of deaerated water is then pressurized to about 44 bar by Feedwater Pump 320 and flows to Economizer 440 to be heated by exhaust gas to a temperature of about 233° C. (about 20° C. below the saturation temperature at 44 bar).

The economized feedwater then enters the Molten Salt Steam Generator (MSSG) 500 to be evaporated using heat transferred from hot molten salt. MSSG 500 may be any suitable type of boiler, including Once-Through, forced or natural convection recirculating drum, kettle. In the case of recirculating and kettle type boilers, there will be need for blowdown to remove accumulated dissolved solids. Once-through type boilers would require feedwater treatment that removes dissolved solids from the incoming feedwater. In this embodiment, about 0.36 kg/s of saturated liquid is extracted as blowdown from MSSG 500, flows to the Flash Tank 570, which is maintained at a pressure of about 4.25 bar by pressure control valve 575. Steam that flashes as result of the pressure reduction is directed to the Deaerator 300, and liquid is directed to a drain cooler, not shown, and then disposed or treated.

To heat the feedwater to saturation temperature and boil the approximately 46 kg/s of water remaining after blowdown, approximately 319 kg/s of molten salt at a temperature of 425° C. enters MSSG 500 to produce saturated steam at a pressure of 42 bar. The salt leaves the MSSG 500 at about 258° C. and returns to the Cold Salt Storage Tank 1050. The pressure within MSSG 500 is controlled by varying the flow rate of salt into MSSG 500. Variation of the entering salt temperature due to heat loss from Thermal Energy Storage System 1000 are compensated by increasing or decreasing the salt flow rate, which may be accomplished by varying the Hot Salt Pump 1020 speed or by adjusting flow control valves. For example, at 420° C. hot salt temperature, the salt flow rate would increase to about 329 kg/s.

Steam flows from MSSG 500 to superheater 600 to be heated by exhaust gas to a temperature of about 425° C. and then flows to the steam turbine 700 to produce power. A fraction of the steam is extracted from steam turbine 700 at a pressure of about 4.25 bar to heat water in Deaerator 300 as previously described. After producing power, low-pressure steam at about 84 millibar exits steam turbine 700, with about 12% moisture content. The wet steam is then cooled in condenser 100 and drained into the hotwell, completing the Rankine steam cycle circuit.

The LSCC system may operate at full power as described above using fuel for combustion turbine 800 and stored energy to evaporate water in MSSG 500. During discharge operating mode, the system will lose about 1000 kW of heat to the environment through the insulation on the Heat Recovery System 900, Molten Salt Steam Generator 500, Deaerator 300, Steam Turbine 700, and interconnecting piping. In a typical embodiment about 60% of the heat losses would be from the Rankine Cycle components, with the balance from the Heat Recovery System.

When there is insufficient energy in storage to continue operating or when the electrical price is too low to economically discharge energy from storage, the discharge operating mode is terminated and the system enters the standby or charging operating modes. After shutdown of the discharge process, the rate of heat loss will decline as the components cool and the temperature difference between the hot components and environment decreases. To return to the full power discharge operating mode, it will be necessary to return the system to operating temperature. After a long period in standby or charging mode, the Rankine cycle equipment may cool below the freezing temperature of the salt, so apparatus and methods are needed to restart the discharge operating mode.

Figure 1:
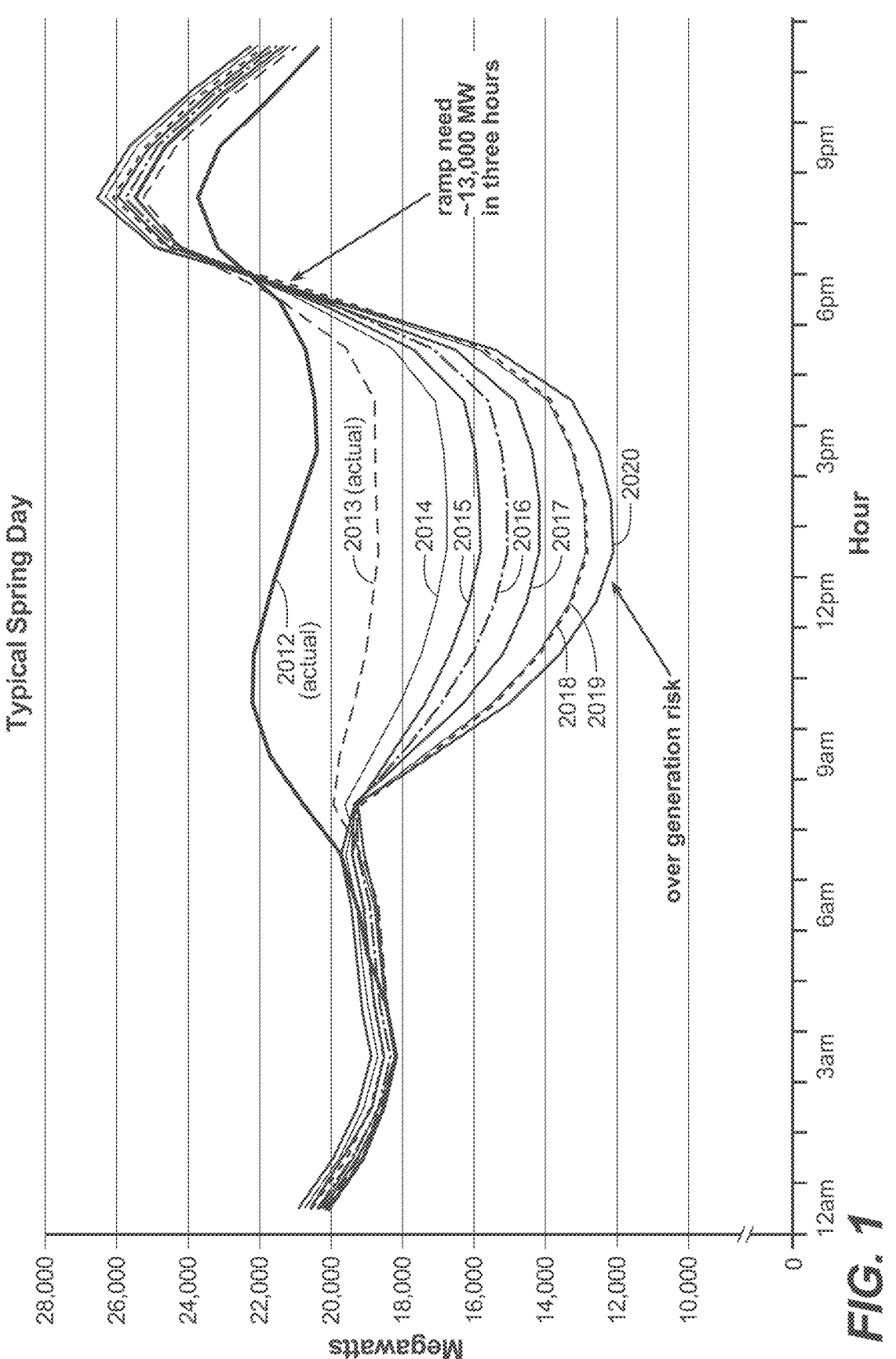
FIG. 1 shows plots of the California Independent System Operator Base Load as a function of time of day—the "Duck" curve.

A conventional combined cycle power plant without thermal energy storage typically uses exhaust heat to start the steam cycle. High-pressure components have thick walls, that can develop excessive thermal stress if they are heated too quickly, so start-up may require lengthy warm-up periods, during which the combustion turbine may operate at part load and low efficiency, and emit high concentrations of regulated pollutants because emissions are not at operating temperature. Where combined cycle plants must start and stop daily because of variable renewable power as in FIG. 1, the warm-up requirements reduce profitability and increase emissions of greenhouse gases and pollutants.

The LSCC embodiment described above operates at modest temperatures, so the wall-thickness of pressure components is not as limiting as in conventional combined cycle plants. The present invention provides methods and apparatus to start quickly when renewable power fades, achieve full power in a short period to emit fewer greenhouse gases and other pollutants during start-up.

In the just-described embodiment, the deaerator 300 operates at 4 bar pressure, higher than the commonly used deaerator pressure of about 1.2 bar, with 102.3° C. saturation temperature. The saturation temperature at 4 bar is about 143.6° C., which is above the freezing point of the Hitec molten salt. One aspect of the embodiment just described is that feedwater can be provided from Deaerator 300 to MSSG 500 without using exhaust heat, permitting the steam Rankine Cycle to operate independently of the combustion turbine 800, making it simpler, faster and less expensive to start the system, or to maintain the steam system ready to operate.

To start the steam cycle of FIG. 4 from a cold condition, feedwater to MSSG 500 must be heated to reduce the risk of salt freezing in the vicinity of the feedwater inlet. The Deaerator 300 would typically be sized to hold about 10 minutes of water inventory to allow continued operation of Feedwater Pump 320 for a period of time to overcome interruption of the flow of water into the Deaerator 300. In the embodiment described above the mass of water in Deaerator 300 would be 46.5 kg/s times 600 s, or 27,900 kg of water, or about 7700 US gallons. To warm this mass from 15° C. to the normal operating condition of 143° C. would require approximately 15 million kJ (4166 KWh) of heat (27900 kg×128° C.×4.18 KJ/kg-° C.).

Allowing for some losses and the mass of the Deaerator vessel, a 4250 kW heater, either electric or fired, could heat the Deaerator 300 to operating temperature within about an hour. An electric heater could be immersed in the Deaerator vessel, or water could be recirculated through an external heater and back to Deaerator 300. In the example of the present invention shown in FIG. 4, the heating is accomplished by circulating water through a Start-up Heater 330 to raise the water temperature above the freezing point of salt. With heated feedwater, the MSSG 500 can be used to further heat the Deaerator 300 as is next described. The freezing point of the salt will increase if the composition is different from the eutectic mixture described above, as may occur because of variation in the salt supply or manufacturing process or because of oxidation of the nitrite to nitrate, which could occur if the salt was overheated in the presence of oxygen. The feedwater temperature setpoint of the Startup Heater 330 would be adjusted according to the actual composition, which may require corresponding adjustment of the flow rate or heater power.

Feedwater Pump 320 draws water from the cold Deaerator 300 and directs about 1.66 kg/s to Start-up Heater 330. Feedwater Pump 320 may recirculate most of the water back to Deaerator 300 via Flow Control Valve 325 or a variable speed motor on Feedwater Pump 320 can adjust the flow rate and pressure, or a combination of both. Alternatively, a smaller start-up pump could be used during start-up instead of Feedwater Pump 320. The Start-up Heater 330 heats the water to about 143° C., slightly above the salt freezing point. The MSSG 500 uses hot salt to boil this water and produce steam which is then delivered via pressure control valve 520 to Deaerator 300 to warm water in the deaerator 300. At 4 bar, the enthalpy of saturated steam is 2738.5 KJ/kg, and at 15° C., the liquid water enthalpy is 63.1 KJ/kg. At 1.66 kg/s steam flow rate to the Deaerator, saturated steam condensing in the deaerator would deliver [1.66×(2738.5−63.1)]=4441 kW of heating. Heating 1.66 kg/s of feedwater in the Start-up Heater 330 from 15° C. to 143° C. would require [1.66 kg/s×4.18 KJ/kg×128 KJ/kg-° C.]=888 KW. This approach enables the start-up of the MSSG and Deaerator, without risk of salt freezing and reduces the amount of electrical power needed during start-up compared to an electric-only approach.

The water inventory within Deaerator 300 may be reduced prior to start-up in order to reduce the mass of water to be heated during start-up. For example, as part of the shutdown process, the water inventory could be reduced by storing condensate in the hotwell of Condenser 100 or in a condensate holding tank instead of using Condensate Pump 120 to forward water to Deaerator 300. As the water temperature in Deaerator 300 is increased, the flow rate of water through start-up heater 330 may be increased during the start-up process, while keeping the temperature at the exit of start-up heater 330 constant. This would allow steam generation in MSSG 500 to more rapidly bring Deaerator 300 to operating pressure and temperature. Alternatively, the power to the start-up heater 330 could be reduced while maintaining flow rate and exit temperature to reduce the amount of electric power used.

The method and apparatus just described rapidly bring the Deaerator 300 to operating conditions while minimizing the risk of salt freezing in MSSG 500, avoiding the use of fuel in combustion turbine 800 and reducing the amount of electric power required during start-up, by instead using electric energy that was stored during a lower-cost period.

If MSSG 500 has cooled, it may need to be preheated prior to introducing molten salt, for example by use of electric heating blankets under insulation, or by circulating water from the Deaerator 300 and start-up Heater 330 through the MSSG 500. During charging and standby operating modes, it may be advantageous to maintain MSSG 500 in a warm state, at a temperature above the salt freezing point. Heat losses from MSSG 500 could be balanced via circulating a small amount of molten salt heat transfer fluid, via electric heating blankets, or via steam from an external source.

It may be advantageous to maintain the Deaerator 300 at or near normal operating conditions during charging and standby in order to eliminate or reduce its warm-up period. For example, after the combustion turbine 800 is turned off, feedwater could be recirculated from the start-up heater 330 and back to the Deaerator 300 via valve 355. A well-insulated Deaerator 300 would have low heat losses, so the power requirements for start-up heater 330 would be low. While the system was charging with low-cost electricity during the charging operating mode, it would be economical to use electric power for this purpose.

MSSG 500 could also be used to deliver steam to the Deaerator 300 to maintain the 4 bar pressure and corresponding saturation temperature. The flow rate of molten salt would be greatly reduced from the full power case as there would only need to be compensation for heat losses from the system. Rather than a continuous flow of salt, it might be convenient to periodically flow hot salt into MSSG 500 to replace salt that has cooled from heat loss to the environment and heat transfer to the steam used to overcome heat losses in Deaerator 300. The steam pressure in MSSG 500 could be allowed to cycle, increasing as the inventory of hot salt is periodically replenished, and decreasing as steam flows to Deaerator 300.

MSSG 500 can also produce steam to warm the steam cycle or keep it ready to run without requiring operation of the combustion turbine. For example, steam could be used to maintain condenser vacuum and to warm or even operate the steam turbine generator 700 at a minimal condition, such as low-speed rotation, or up to synchronous speed. Steam from MSSG 500 can be directed through three-way valves 535 and 635 to bypass superheater 600 in order to warm the steam turbine.

Instead of using salt from Hot Salt Storage Tank 1010, salt from Cold Salt Storage Tank 1050 could be directed to MSSG 500 via three-way valve 1005. The cold salt could sustain steam generation in MSSG 500 at reduced pressure and flow rates, still sufficient to keep the balance of the steam system, including Deaerator 300 and Steam Turbine 700 warm. As described previously, during full-power operation the cold salt leaves MSSG 500 at a temperature of about 258° C., which corresponds to a saturated steam pressure of about 45 bar. One hour of discharge operation described above, at a steam flow rate of 46 kg/s requires about 319 kg/s of salt operating with temperature difference of about 167° C., which corresponds to about 83102 kW of energy from salt with specific heat of 1.56 KJ/kg° C. At pressure of 10 bar, the enthalpy of saturated steam is about 2778 KJ/kg, and the enthalpy of 4 bar saturated water from Deaerator 300 is about 605 KJ/kg, so producing 1 kg/s of steam at 10 bar (180° C.) would require 2173 KJ/s (or KW) of heat from salt. Assuming salt entered MSSG 500 at 258° C. and exited at 200° C., still well above the salt freezing point of 142° C., a flow rate of 24.0 kg/s of salt would deliver about 2175 KW of heating to produce 1 kg/s of steam. Heat losses from a well-insulated system should be a fraction of this power, so after one hour of discharge operation, there would be sufficient energy in the cold salt storage tank 1050 to maintain the steam system in a warm condition for a day or more.

To be sure, the energy withdrawn from the Cold Salt Storage Tank 1050 will necessitate replenishment during charging mode. By charging when the cost of electricity is low or even free, as when renewable energy is over-abundant, the cost of maintaining the LSCC ready to operate can be minimized. The modest cost of keeping the LSCC system ready to run can be recovered by more quickly transitioning to the discharge operating mode in response to higher prices when renewable electricity becomes unavailable. When the system is in charging mode, molten salt from cold salt storage tank 1050 could flow through MSSG 500 en route to Hot Salt Storage Tank 1010. Cold salt could be drawn through valve 1075 or hot salt could be drawn through valve 1080 after flowing through Charging heater 1100.

In addition to keeping the system warm with saturated steam, it may be desirable to keep the steam turbine 700 closer to its operating temperature or to warm it to near operating temperature without using combustion turbine exhaust heat. In one embodiment, hot salt from Hot Salt Pump 1020 is diverted by valves 1015 and 1025 to Start-up Superheater 620 to heat steam from MSSG 500 that flows through three-way valve 515 to Start-up Superheater 620 and then through three-way valve 625 to deliver superheated steam to Steam Turbine 700. The enthalpy of steam at 10 bar and 400° C. is about 3265 KJ/kg, so heating 1 kg/s of 10 bar saturated water would require 2660 KJ/s (KW). Using salt with a specific heat of 1.56 KJ/kg° C. from Hot Storage Tank 1010 entering MSSG 500 at 425° C. and exiting at 200° C. would require about 7.6 kg/s of salt per kg/s of steam.

The Start-up Superheater 620 could also be placed in series with the MSSG 500, so that there was always some degree of superheating during normal operation, with the steam temperature leaving the start-up superheater decreasing in proportion to steam flow rate from MSSG 500. The heat transfer in the start-up superheater 620 is equal to the enthalpy change required to heat 10 bar saturated steam (2777.1 KJ/kg) to 400° C. (3264.5 KJ/kg). So a start-up superheater 620 that was capable of producing 1 kg/s of 400° C. superheated steam at 10 bar would require about 487.4 KJ/kg (487.4 kW) of heat transfer. Under the full power condition described earlier 46 kg/s of 42 bar saturated steam (2799.8 KJ/kg) leaves MSSG 500 at a temperature of 253° C., and its enthalpy is increased by 10.6 KJ/kg (487.4 kJ/s/46 kg/s) to 2810.4 KJ/kg, which corresponds to a temperature of 255.9° C. This steam could flow directly into superheater 600 to be heated to the normal operating temperature of 425° C.

If in series, the start-up superheater 620 could be integral to MSSG 500, as for example, in a vertical once-through type counter-current MSSG with salt entering at the top and feedwater entering at the bottom. Along the vertical length, the salt temperature decreases from top to bottom, and the steam quality (vapor mass fraction) increases from bottom to top. The ratio of feedwater flow to hot salt flow could be adjusted to induce dry-out (100% steam quality) and then permit superheating to occur before the steam exits at the top.

When steam is flowing from the MSSG 500, either to steam turbine 700 or bypassed via valve 645 to the condenser, and with or without a start-up superheater 620, the system is ready for combustion turbine start-up. It is desirable to wait until combustion turbine light-off (the ignition of fuel), before admitting steam to superheater 600 to minimize or avoid steam condensation within the superheater 600.

Before starting the combustion turbine 800, the exhaust heat recovery system is purged of potentially flammable or explosive residual fuel that may have accumulated in the gas path, such as from leakage through fuel valves. This is typically done by motoring the combustion turbine, i.e., using a starter motor to rotate combustion turbine 800 to flow ambient air through the combustion turbine and exhaust gas path. During the purge, ambient air cools the heat transfer components within the exhaust gas path, so it is desirable that water and steam bypass the Condensate Heater 240, the economizer 440 and superheater 600 until the purge is complete to avoid cooling the condensate, feedwater, and steam. Even after purge is complete, there may be a natural draft of ambient air through the Heat Recovery System, so it is desirable to bypass it until after combustion turbine 800 light-off.

Following light-off of combustion turbine 800, the exhaust gas flow rate and temperature will increase as the rotational speed increases, until its generator is synchronized with the grid and loaded. As the rotational speed increases, the metal temperature of superheater 600 will warm up above the steam saturation temperature, so steam can be introduced into the superheater from MSSG 500 or from a Start-up Superheater 620 in series with MSSG 500, without risk of condensation.

With exhaust heat available, feedwater can be directed into the Economizer 440 and the flow through start-up heater 330 can be stopped using three-way valves 345 and 355. The feedwater flow rate from the Boiler Feed Pump 320 is then adjusted to maintain the desired temperature at the outlet of economizer 440. If the feedwater flow rate exceeds the flow required by MSSG 500, excess water can be directed to Condenser 100 via bypass valve 455.

After the steam turbine generator is synchronized, the flow of steam from MSSG 500 is increased to load the steam turbine. Alternatively, the MSSG 500 could be producing steam at or near full power, with most steam bypassed to the Condenser via valve 645, and the steam turbine can be loaded by changing the steam bypass fraction.

The flow rate of hot salt to MSSG 500 is increased to control the steam pressure. If the steam temperature to the Steam Turbine 700 is too high, because steam flow rate is inadequate or the steam turbine has not been fully heated, feedwater is directed by control valve 350 to attemperator 630 to cool the superheated steam. Attemperator 630 may be located between banks of superheater tubes as shown in FIG. 4, or downstream of the superheater 600.

In the manner just described, the combustion turbine 800 and steam turbine 700 can be coordinated in ramping to full power. As the system approaches full power, the feedwater and steam bypass valves to the condenser are closed, and the entire system operates as described earlier.

The following enumerated clauses provide additional non-limiting aspects of the disclosure.

1. A combined cycle electric power plant comprising:
   a combustion turbine generator that combusts fuel to generate electricity and produce hot exhaust gases;
   a second heat source, different from the combustion turbine;
   a thermal energy storage system that stores heat from the second heat source;
   a steam turbine generator that expands superheated steam across a steam turbine to generate electricity;
   a feedwater reservoir that stores feedwater condensed from steam exhausted from the steam turbine;
   a feedwater preheater configured to heat feedwater from the feedwater reservoir with heat exclusively from the combustion turbine exhaust gases;
   a boiler configured to boil feedwater from the feedwater preheater with heat exclusively from the thermal energy storage system to generate steam;
   a superheater configured to heat steam from the boiler exclusively with heat from the combustion turbine exhaust gases to generate the superheated steam;
   a third heat source, different from the combustion turbine; and
   a startup feedwater heater configured to use heat from the third heat source to heat feedwater from the feedwater reservoir to a temperature greater than a freezing point of a heat transfer fluid used to transfer the heat from the thermal energy storage system to the boiler.

2. The combined cycle electric power plant of clause 1, wherein the startup feedwater heater is arranged in parallel with the feedwater preheater between the feedwater reservoir and the boiler.

3. The combined cycle electric power plant of clause 1 or clause 2, comprising a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

4. The combined cycle electric power plant of any of clauses 1-3, wherein the heat transfer fluid is a molten salt.

5. The combined cycle electric power plant of clause 4, wherein the molten salt is a three component eutectic mixture of 53% potassium nitrate, 7% sodium nitrate, and 40% sodium nitrite.

6. The combined cycle electric power plant of any of clauses 1-5, comprising a startup superheater connected in parallel with the superheater between the boiler and the steam turbine and configured to heat steam from the boiler using heat exclusively from the thermal energy storage system.

7. A method of operating the combined cycle power plant of any of clauses 1-6, the method comprising heating feedwater from the feedwater reservoir to a temperature greater than the freezing point of the heat transfer fluid using the startup feedwater heater.

8. The method of clause 7, comprising recirculating the feedwater heated by the startup feedwater heater to the feedwater reservoir to heat feedwater in the feedwater reservoir to a temperature greater than the freezing point of the heat transfer fluid.

9. The method of clause 7 or clause 8, comprising heating the boiler to a temperature greater than the freezing point of the heat transfer fluid using feedwater heated by the startup feedwater heater.

10. The method of clause 9 comprising, after heating the boiler to a temperature greater than the freezing point of the heat transfer fluid, circulating heat transfer fluid from the thermal energy storage system through the boiler to generate steam from feedwater using heat transferred by the heat transfer fluid from the thermal energy storage system.

11. The method of clause 10, comprising directing steam generated in the boiler to the feedwater reservoir to heat feedwater in the feedwater reservoir.

12. The method of clause 11, wherein steam flow to the feedwater reservoir is regulated to heat feedwater in the feedwater reservoir to a temperature greater than the freezing point of the heat transfer fluid.

13. The method of clause 11, wherein as the temperature of the feedwater in the feedwater reservoir increases, a flow rate of feedwater through the startup feedwater heater is increased.

14. The method of clause 11, wherein as the temperature of the feedwater in the feedwater reservoir increases, heat input to the startup feedwater heater from the second heat source is decreased.

15. The method of any of clauses 7-14, comprising:

bypassing the superheater to provide steam from the boiler to the startup superheater;

superheating the steam in the startup superheater; and expanding the superheated steam across the steam turbine.

This disclosure is illustrative and not limiting. Further modifications will be apparent to one skilled in the art in light of this disclosure and are intended to fall within the scope of the appended claims.

What is claimed is:

1. A combined cycle electric power plant comprising:

a combustion turbine generator that combusts fuel to generate electricity and produce hot exhaust gases;

a second heat source, different from the combustion turbine generator;

a thermal energy storage system that stores heat from the second heat source;

a steam turbine generator that expands superheated steam across a steam turbine to generate electricity;

a feedwater reservoir that stores feedwater condensed from steam exhausted from the steam turbine generator;

a feedwater preheater configured to heat feedwater from the feedwater reservoir with heat exclusively from the combustion turbine generator exhaust gases;

a boiler configured to boil feedwater from the feedwater preheater with heat exclusively from the thermal energy storage system to generate steam;

a superheater configured to heat steam from the boiler exclusively with heat from the combustion turbine generator exhaust gases to generate the superheated steam;

a third heat source, different from the combustion turbine generator; and a startup feedwater heater arranged in parallel with the feedwater preheater between the feedwater reservoir and the boiler and configured to use heat from the third heat source to heat feedwater from the feedwater reservoir to a temperature greater than a freezing point of a heat transfer fluid used to transfer the heat from the thermal energy storage system to the boiler.

2. The combined cycle power plant of claim 1, wherein the boiler is fluidly coupled to the feedwater reservoir to provide steam to the feedwater reservoir.

3. The combined cycle electric power plant of claim 1, comprising a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

4. The combined cycle power plant of claim 3, wherein the boiler is fluidly coupled to the feedwater reservoir to provide steam to the feedwater reservoir.

5. The combined cycle electric power plant of claim 1, wherein the heat transfer fluid is a molten salt.

6. The combined cycle electric power plant of claim 5, wherein the molten salt is a three component eutectic mixture of 53% potassium nitrate, 7% sodium nitrate, and 40% sodium nitrite.

7. The combined cycle electric power plant of claim 5, comprising a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

8. The combined cycle power plant of claim 7, wherein the boiler is fluidly coupled to the feedwater reservoir to provide steam to the feedwater reservoir.

9. The combined cycle power plant of claim 5, wherein the boiler is fluidly coupled to the feedwater reservoir to provide steam to the feedwater reservoir.

10. A combined cycle electric power plant comprising:

a combustion turbine generator that combusts fuel to generate electricity and produce hot exhaust gases;

a second heat source, different from the combustion turbine generator;

a thermal energy storage system that stores heat from the second heat source;

a steam turbine generator that expands superheated steam across a steam turbine to generate electricity;

a feedwater reservoir that stores feedwater condensed from steam exhausted from the steam turbine generator;

a feedwater preheater configured to heat feedwater from the feedwater reservoir with heat exclusively from the combustion turbine generator exhaust gases;

a boiler configured to boil feedwater from the feedwater preheater with heat exclusively from the thermal energy storage system to generate steam;

a superheater configured to heat steam from the boiler exclusively with heat from the combustion turbine generator exhaust gases to generate the superheated steam;

a third heat source, different from the combustion turbine;

a startup feedwater heater configured to use heat from the third heat source to heat feedwater from the feedwater reservoir to a temperature greater than a freezing point of a heat transfer fluid used to transfer the heat from the thermal energy storage system to the boiler; and a startup superheater connected in parallel with the superheater between the boiler and the steam turbine generator and configured to heat steam from the boiler using heat exclusively from the thermal energy storage system.

11. The combined cycle electric power plant of claim 10, wherein the startup feedwater heater is arranged in parallel with the feedwater preheater between the feedwater reservoir and the boiler.

12. The combined cycle electric power plant of claim 11, comprising a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

13. The combined cycle electric power plant of claim 11, wherein the heat transfer fluid is a molten salt.

14. The combined cycle power plant of claim 11, wherein the boiler is fluidly coupled to the feedwater reservoir to provide steam to the feedwater reservoir.

15. The combined cycle electric power plant of claim 10, comprising a circuit that returns feedwater heated in the startup feedwater heater to the feedwater reservoir at a temperature greater than the freezing point of the heat transfer fluid to heat additional feedwater in the feedwater reservoir to a temperature greater than the freezing point of the heat transfer fluid.

16. The combined cycle power plant of claim 15, wherein the boiler is fluidly coupled to the feedwater reservoir to provide steam to the feedwater reservoir.

17. The combined cycle electric power plant of claim 10, wherein the heat transfer fluid is a molten salt.

18. The combined cycle power plant of claim 17, wherein the boiler is fluidly coupled to the feedwater reservoir to provide steam to the feedwater reservoir.

19. The combined cycle electric power plant of claim 17, wherein the molten salt is a three component eutectic mixture of 53% potassium nitrate, 7% sodium nitrate, and 40% sodium nitrite.

20. The combined cycle power plant of claim 10, wherein the boiler is fluidly coupled to the feedwater reservoir to provide steam to the feedwater reservoir.

* * * * *